United States Patent [19]
Ten Kate

[11] Patent Number: 5,878,080
[45] Date of Patent: Mar. 2, 1999

[54] N-CHANNEL TRANSMISSION, COMPATIBLE WITH 2-CHANNEL TRANSMISSION AND 1-CHANNEL TRANSMISSION

[75] Inventor: Warner R. T. Ten Kate, Eindhoven, Netherlands

[73] Assignee: U.S. Philips Corporation, New York, N.Y.

[21] Appl. No.: 795,120

[22] Filed: Feb. 7, 1997

[30] Foreign Application Priority Data

Feb. 8, 1996 [EP] European Pat. Off. ............... 9620274
May 2, 1996 [EP] European Pat. Off. ............. 96201216

[51] Int. Cl.$^6$ .................................................. H04B 1/66
[52] U.S. Cl. ........................................... 375/241; 370/537
[58] Field of Search .................................. 375/241, 295, 375/377; 381/2, 6, 14, 27; 370/537, 542; 395/2, 2.12

[56] References Cited

U.S. PATENT DOCUMENTS

| | | | |
|---|---|---|---|
| 4,455,649 | 6/1984 | Esteban et al. | 381/29 |
| 5,274,740 | 12/1993 | Davis et al. | 395/2.12 |
| 5,463,424 | 10/1995 | Dressler | 381/22 |

FOREIGN PATENT DOCUMENTS

| | | |
|---|---|---|
| 0457390A1 | 11/1991 | European Pat. Off. . |
| 0457391A1 | 11/1991 | European Pat. Off. . |
| WO9512254 | 5/1995 | WIPO ............................... H04B 1/66 |

OTHER PUBLICATIONS

"A New Surround–Stereo–Surround Coding Techique", by W.R. Ten Kate, J. Audio Eng. Soc., vol. 40, No. 5, May 1992.

"Matrixing of Bit Rate Reduced Audio Signals", by W.R. Ten Kate, Proc. ICASSP, 1992, Mar. 23–26, San Francisco, vol. 2, pp. II–205–II–208.

*Primary Examiner*—Temesghen Ghebretinsae
*Attorney, Agent, or Firm*—Edward W. Goodman

[57] ABSTRACT

A 3-channel encoder and corresponding decoder is disclosed for encoding a 3-channel signal into a transmission signal which is backwards compatible, so that prior art one channel decoders are capable of decoding the transmission signal into a mono signal and 2-channel decoders are capable of decoding the transmission signal into a compatible stereo signal. Further, a 3-channel decoder is disclosed for decoding the transmission signal into a 3-channel signal. Also a 4-channel encoder is disclosed for encoding the 4-channel signal into a transmission signal which is backwards compatible, so that prior art one channel decoders are capable of decoding the transmission signal into a mono signal and 2-channel decoders are capable of decoding the transmission signal into a compatible stereo signal.

20 Claims, 11 Drawing Sheets

N-CHANNEL TRANSMISSION, COMPATIBLE WITH 2-CHANNEL TRANSMISSION AND 1-CHANNEL TRANSMISSION

BACKGROUND OF THE INVENTION

1. Field of the Invention

The invention relates to an encoder apparatus for encoding a plurality of digital information signals into a transmission signal, to a method for encoding the plurality of digital information signals, and to a decoder apparatus for decoding the transmission signal so as to regenerate replicas of the plurality of digital information signals. An encoder apparatus in accordance with the opening paragraph is known from European Patent Application EP 678,226-A1, corresponding the U.S. Pat. No. 5,544,247, and U.S. patent application Ser. No. 08/651,016, filed May 21, 1996, which is Document (8) in the List of References at the end of this Description.

2. Description of the Related Art

Matrixing can be carried out when transmitting a first main signal component (the left hand signal component L of a stereo signal), a second main signal component (the right hand signal component R) and an auxiliary component (a central signal component C), such that a first composite signal component $L_0$ is obtained which equals $L+a.C$ and a second composite signal $R_0$ is obtained which equals $R+b.C$, and where the signals $L_0$, $R_0$ and C are transmitted. Upon reception by a standard receiver not being provided with a corresponding dematrixing circuit, the signal components $L_0$ and $R_0$ are used for supplying via two stereo loudspeakers to a listener. The listener is thus able to perceive the C component transmitted as well, although he has a standard receiver.

Such matrixing schemes are discussed in J.A.E.S., Vol. 40, No. 5, May 1992, pp. 376–382, as well as in the publication 'Matrixing of bitrate reduced audio signals' by W.R.Th. ten Kate et al, in Proc. of the ICASSP, 1992, March 23–26, San Francisco, Vol.2, pp. 11–205 to II-208, Documents (1a) and (1b) in the List of References, as well as Document (8).

Compression means for bit rate reducing a signal has been described in published European Patent Applications EP 457,390A1, corresponding to U.S. Pat. No. 5,367,608 (PHN 13.328) and 457,391A1 corresponding to U.S. Pat. No. 5,365,553 (PHN 13.329), Documents (7a) and (7b) respectively in the List of References. Further, reference is made to two ISO/IEC Standard Documents, Documents (9) and (10) in the List of References, referred to as MPEG-1 and MPEG-2 documents.

SUMMARY OF THE INVENTION

The invention aims at providing a different encoder apparatus for encoding the plurality of information signals at relatively low bit rates.

In accordance with the invention, the apparatus for encoding a plurality of digital information signals, having at least first input means for receiving a first digital information signal, second input means for receiving a second digital information signal, third input means for receiving a third digital information signal, matrixing means for generating a digital composite signal from the at least first, second and third digital information signals, the matrixing means comprising:

first signal combination means for combining at least the first and second digital information signal and being adapted to generate a first combination signal, second signal combination means for combining at least the second and third digital information signal so as to obtain a second combination signal, third signal combination means for combining at least the first and second combination signals so as to obtain the composite signal, the apparatus further comprising:

first data compression means for data compressing the digital composite signal so as to obtain a data reduced digital composite signal, selection means for selecting one signal from the first and second combination signals so as to obtain a first auxiliary signal and for selecting at least one signal from the at least first, second and third digital information signals so as to obtain at least a second auxiliary signal, at least second and third data compression means for data compressing the at least first and second auxiliary signal respectively so as to obtain at least first and second data reduced auxiliary signals, respectively, and formatting means for combining the data reduced composite signal and the at least first and second data reduced auxiliary signals into a transmission signal suitable for transmission via a transmission medium.

The invention is based on the following recognition. The invention resides in the objective to provide, as an example, a 3-channel encoder apparatus, which is backwards compatible so as to enable not only 3-channel decoding, but also enables 2-channel decoding and a 1-channel decoding using prior art decoders. Such an encoder apparatus is meant to encode the three information signals introduced above, namely the signals for the left front loudspeaker (from now on defined as L loudspeaker and L signal), the right front loudspeaker (from now on defined as R loudspeaker and R signal) and the signal (C) for a front center loudspeaker. More specifically, the encoding must be realized such that decoding by a standard mono decoder will result in the generation by the decoder of a composite mono signal, that decoding by a standard stereo decoder will result in the generation by the decoder of a compatible stereo signal, and that decoding by a corresponding 3-channel decoder will result in the generation by the decoder of the original three signals supplied to the encoder.

To realize such decoding, the encoder generates a composite signal from the three original signals, which composite signal can be used as the mono signal upon decoding by a mono decoder. Further, one combination signal is selected from two combination signals generated in the encoder. Upon decoding by a standard stereo decoder, the decoder can decode the composite signal and the one selected combination signal and can retrieve the other combination signal from the composite signal and the selected combination signal. The two combination signal thus obtained can be reproduced as a stereo signal by the stereo decoder. Further, one of the three original signals is selected and also transmitted. Upon decoding by a 3-channel decoder, this decoder is capable of also retrieving the one original signal transmitted and can retrieve the other two original signal from the composite signal, the one selected combination signal and the one selected original signal. The replicas of the three original signals thus obtained can be reproduced by the three loudspeakers introduced above.

But also a 4-channel signal can be encoded in accordance with the invention. Again, one composite signal is generated and encoded for transmission. Again, one combination signal from two combination signals generated is selected for transmission. Further, two of the original four signals are selected for transmission. Upon decoding, either the composite signal is reproduced as a mono signal, or the two combination signals regenerated are reproduced as a stereo signal, or the four signals are regenerated and reproduced.

BRIEF DESCRIPTION OF THE DRAWINGS

These and other aspects of the invention will be apparent from and elucidated further with reference to the embodiments described in the following figure description, in which:

FIG. 1b shows an embodiment of the signal combination units in FIG. 1a;

Part of a first embodiment of the encoder is shown in FIG. 1a and another part of the encoder is shown in FIG. 2. FIG. 1a shows the part of the encoder for deriving the composite signal $M_0$. The encoder has input terminals 1, 2 and 3 for receiving the three information signals L, C and R in digital form. The three information signals may be wideband digital audio signals having a bandwidth of e.g. 16 kHz, so that they could have been sampled at 32 kHz. The input terminals 1 and 2 are coupled to respective inputs 22 and 24 of a signal combination unit 10. An output 26 of the signal combination unit 10 is coupled to an input 28 of a signal combination unit 14. The input terminals 2 and 3 are coupled to respective inputs 30 and 32 of the signal combination unit 12. An output 34 of the signal combination unit 12 is coupled to an input 36 of the signal combination unit 14.

As shown in FIG. 1b, the signal combination units 10, 12 and 14 combine the signals applied to their inputs by multiplying the signals by respective multiplier values A and B in multipliers 15 and 16, and by adding the output signals from the multipliers 15 and 16 in adder 17. Alternatively, the signal combination units 10, 12 and 14 are simply adders.

At the terminal 54, the composite signal $M_0$ is available. The composite signal $M_0$ satisfies the following relationship:

$$M_0 = S_l + S_r \quad \text{(Eq.1)}$$

Figure 2:
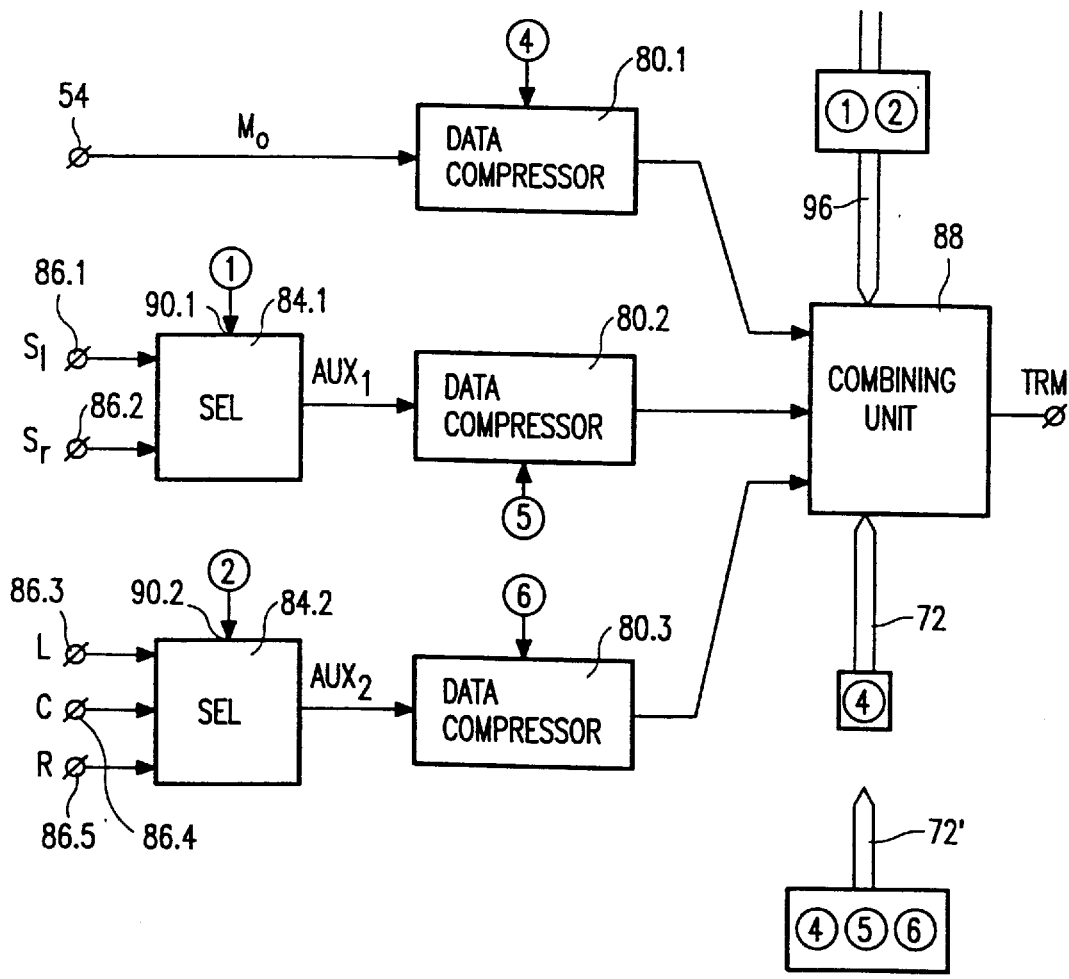
FIG. 2 shows a further part of the encoder apparatus in accordance with the invention.

The composite signal $M_0$ is supplied to a data compression unit 80.1, shown in FIG. 2, so as to obtain a data reduced composite signal. The data reduced compatible signal is converted in the block 88 in FIG. 2 into a transmission signal for transmission via a transmission medium (either a broadcast channel or a storage medium, such as a solid state memory, a magnetic or an optical record carrier). The combining unit 88 combines the signals applied to its input into a serial datastream and possibly also carries out a channel encoding on the information comprised in the serial datastream. Document (5) in the List of References describes one way of channel encoding the serial datastream so as to obtain the transmission signal. Preferably, the serial datastream is in accordance with the ISO/IEC Standard given in Document (9).

Upon reception by a receiver comprising a standard mono decoder, this decoder is capable of decoding the composite signal $M_0$ for mono reproduction via one or more loudspeakers positioned in a room.

At the outputs 26 and 34 of the signal combination units 10 and 12, respectively, signals $S_l$ and $S_r$ respectively, are available that satisfy the following equations:

$$S_l = L + C \quad \text{(Eq.2a)}$$

$$S_r = R + C \quad \text{(Eq.2b)}$$

At this moment, it can be said that the signal applied to the input terminal 2 could have been a surround signal S, instead of the center signal C. When deriving signals $S_l$ and $S_r$ from the three signals L, R and S, they can be derived in the following way:

$$S_l = L + S \quad \text{(Eq.3a)}$$

$$S_r = R - S \quad \text{(Eq.3b)}$$

The encoder is further provided with two selector units 84.1 and 84.2, see FIG. 2. The selector unit 84.1 selects one of the two signals $S_l$ and $S_r$, supplied to the terminals 86.1 and 86.2 respectively. From FIG. 1, it is clear that the terminal 86.1, shown in FIG. 2 is in fact coupled to the output 26 of the signal combination unit 10 (or with the input 28 of the signal combination unit 14), for receiving the signal $S_l$, and that the terminal 86.2 is in fact coupled to the output 34 of the signal combination unit 12 (or with the input 36 of the signal combination unit 14), for receiving the signal $S_r$. The signal selected by the selector 84.1 is called the first auxiliary signal, which is supplied to a data compression unit 80.2. The selector unit 84.2 selects one of the three signals L, C and R supplied to the terminals 86.3, 86.4 and 86.5, respectively. From FIG. 1, it is clear that the terminal 86.3, shown in FIG. 2 is in fact coupled to the input terminal 1 (or with the input 22 of the signal combination unit 10), for receiving the signal L, that the terminal 86.4 is in fact coupled to the input terminal 2, for receiving the signal C, and that the terminal 86.5 is in fact coupled to the input terminal 3 (or with the input 32 of the signal combination unit 12), for receiving the signal R. The signal selected by the selector 84.2 is called the second auxiliary signal, which is supplied to a data compression unit 80.3. The data compressed first and second auxiliary signals are also converted in the block 88 and combined with the data reduced composite signal for transmission via the transmission medium.

Upon reception by a mono decoder, this decoder is capable of decoding the composite signal $M_0$ for mono reproduction. Further, a standard stereo decoder is capable of decoding the $M_0$ signal and the first auxiliary signal, to retrieve the first and second combination signals therefrom and reproduce the first and second combination signals as composite stereo signals via two loudspeakers positioned in a stereo arrangement in a room.

As an example, suppose the selector 84.1 has selected the signal $S_l$ as the first auxiliary signal. The decoder will receive the signals $M_0$ and $S_l$ and the signal $S_r$ can be obtained by $$S_r = M_0 - S_l \tag{Eq.4}$$

The signals $S_l$ and $S_r$ can now be reproduced in a 2-channel stereo reproduction mode by supplying the signal $S_l$ to the left front loudspeaker and the signal $S_r$ to the right front loudspeaker.

Further, a 3-channel decoder is capable of decoding the $M_0$ signal and the first and second auxiliary signals, to retrieve the first, second and third information signals therefrom and reproduce the first, second and third information signals via three loudspeakers positioned in a room.

As an example, suppose the selector 84.1 has selected the signal $S_l$ as the first auxiliary signal and the selector 84.2 has selected the R signal as the second auxiliary signal. The decoder will receive the signals $M_0$, $S_l$ and R. The signal $S_r$ can be obtained as shown above using the equation 4. Further, the signal C can now be obtained using the Equation $$C = S_r - R \tag{Eq.5}$$

Subsequently, the signal L can be obtained using the formula $$L = S_l - C \tag{Eq.6}$$

The selection of the auxiliary signals can be realized as follows. The encoder apparatus is provided with a calculation unit 94a, shown in FIG. 3, which receives, as input signals, the signals $M_0$, L, C, R, $S_l$ and $S_r$. The calculation unit 94a generates two selection signals denoted by encircled numbers 1 and 2. The selection signal with encircled number 1 is supplied to a selection input 90.1 of the selector unit 84.1, see FIG. 2. The selection signal with encircled number 2 is supplied to a selection input 90.2 of the selector unit 84.2.

It will be clear that, in order to enable the decoder to decode the original signals from the signals transmitted via and received from the transmission medium, it will be required to transmit the selection signals together with the transmitted signals. Therefore, in the embodiment of FIG. 2, the selection signals are supplied via the line 96 to the signal combining unit 88. The selection signals are included in the transmission signal for transmission, so that they can be retrieved by the decoder upon reception.

Various algorithms are possible to generate the two selection signals from the input signals supplied to the calculation unit. In one embodiment of the calculation unit, shown in FIG. 3, the calculation unit 94a is adapted to calculate the amount of data reduction to be achieved with the three data compressor units 80.1, 80.2 and 80.3 dependent on which signal from the first group of two signals ($S_l$, $S_r$) has been chosen as the first auxiliary signal, and which signal from the second group of three signals (L, C, R) has been chosen as the second auxiliary signal. The calculation unit 94a is further adapted to establish those selections of one signal from the first group of two signals and one signal from the second group of three signals that result in the largest amount of data reduction to be achieved and generates the two selection signals in response thereto.

Figure 4:
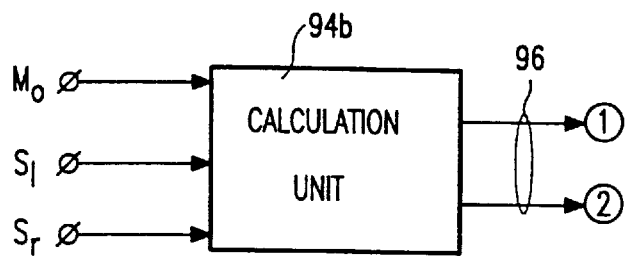

In another embodiment of the calculation unit, shown in FIG. 4, the calculation unit 94b is adapted to calculate the amount of data reduction to be achieved with the data compressor units 80.1 and 80.2 of FIG. 2 dependent on which signal of the two signals from the first group of signals has been chosen as the first auxiliary signal, and which signal of the three signals from the second group of signals has been chosen as the second auxiliary signal. The calculation unit 94b requires therefor, the supply of the signals $M_0$, $S_l$ and $S_r$ only. The calculation unit 94b is further adapted to establish those selections of one signal from the first group of signals and one signal from the second group of signals that result in the largest amount of data reduction to be achieved in the data compressor units 80.1 and 80.2 and to generate the two selection signals in response thereto.

In again another embodiment of the calculation unit 94, not shown in the Figures the calculation unit 94 is adapted to calculate the amount of data reduction to be achieved with the data compressor unit 80.1 of FIG. 2 dependent on which signal of the two signals from the first group has been chosen as the first auxiliary signals and which signal of the three signals from the second group has been chosen as the second auxiliary signal. This embodiment of the calculation unit 94 is further adapted to establish those selections of the one signal from the first group and the one signal from the second group that result in the largest amount of data reduction to be achieved in the data compressor unit 80.1 and to generate the two selection signals in response thereto.

Prior art publications describe the way in which a data reduction can be carried out on a signal applied to a data compressor unit 80.1, 80.2 and 80.3. Reference is made, in this respect to the various documents cited in the List of References, at the end of this Description. One of such data reduction techniques is the sub-band coding data reduction technique, as applied in MPEG-1 and MPEG-2 and DAB (digital audio broadcast). Documents describing the subband coding data reduction technique are Documents (3), (4), (6), (7a), (7b), (9) and (10). In this data reduction technique, signal components below a masked threshold are left out. The masked threshold is obtained from the signal to be data reduced.

Documents (1a), (1b), (2) and (8) describe multi-channel transmission systems in which a compatible stereo signal (signals $L_o$ and $R_o$), are data reduced. In such situations, the masked threshold is generally not obtained from the compatible signals itself, but from any original signal from which the compatible signals have been derived.

Figure 5:
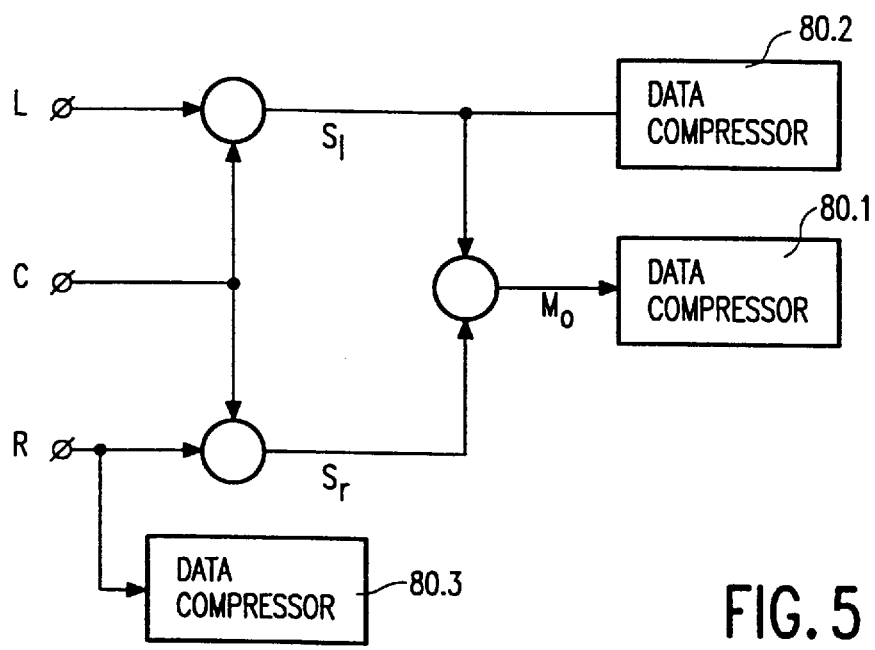
FIG. 5 shows one selection of one of the combination signals for transmission and the selection of one of the three original signals for transmission.

The selection of the masked thresholds will be further explained with reference to FIG. 5, which shows a specific selection for the first and second auxiliary signal. More specifically, the signal $S_l$ has been selected as the first auxiliary signal and the signal R has been chosen as the second auxiliary signal. The masked threshold for the three data compressor units 80.1, 80.2 and 80.3 will be the minimum of the masked thresholds of the signals L, R and C. So, in this embodiment, all the three data compressor units will have the same masked threshold for data compressing the signals $M_0$, $S_l$ and R. For other selections, the reasoning is the same.

Figure 6A:
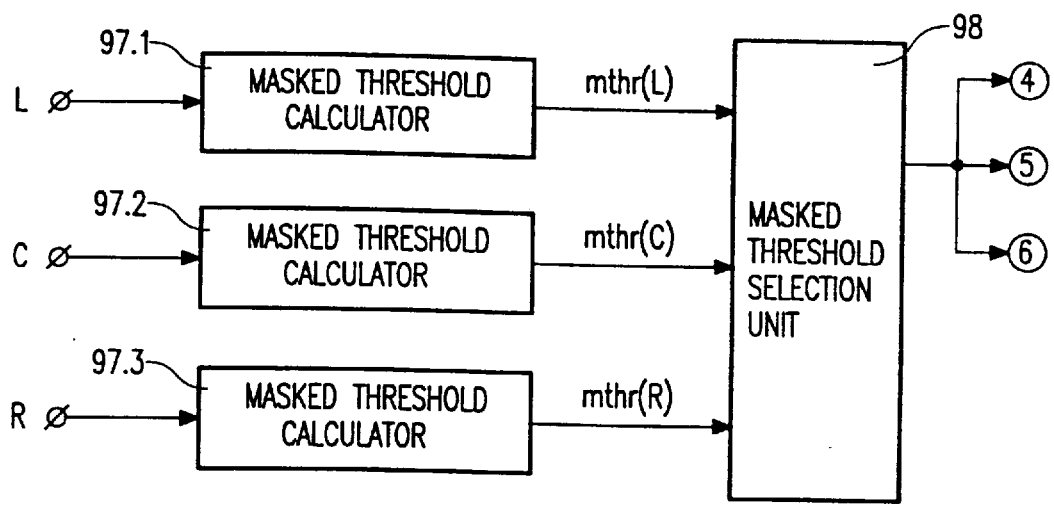
FIG. 6a shows the selection of the masked thresholds required for carrying out the data compression in the three data compression units.

In order to provide the data compression units 80.1, 80.2 and 80.3 with the correct masked threshold in order to carry out a data compression step, a masked threshold selection unit 98 is provided which is shown in FIG. 6a. Three masked threshold calculators 97.1, 97.2 and 97.3 are provided which receive the three signals L, C and R, respectively. The masked threshold calculators 97.1 to 97.3 calculate three masked thresholds mthr(L), mthr(C) and mthr(R) from the signals L, C and R supplied to their inputs, respectively. The three masked thresholds thus obtained are supplied to the selection unit 98. This selection unit 98 selects the lowest masked threshold from the three masked thresholds supplied to its inputs and supplies the lowest masked threshold to its output, which masked threshold, or an instruction signal derived therefrom, is supplied, via the lines denoted with the encircled numbers 4, 5 and 6, to the data compression units 80.1, 80.2 and 80.3.

The selected masked threshold is also supplied to the combining unit 88, see the signal line 72 to the combining unit 88, for transmission to the decoder, as is shown in FIG. 2.

Figure 1A:
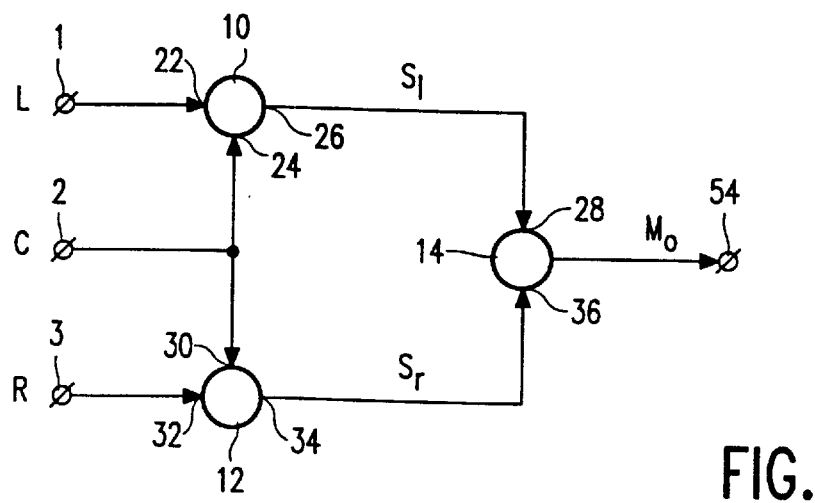
FIG. 1a shows the matrixing circuit in the encoder apparatus in accordance with the invention.
Figure 1B:
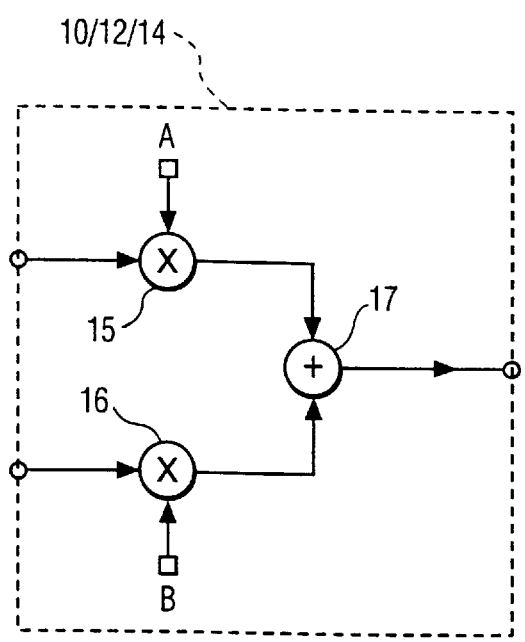
Figure 7A:
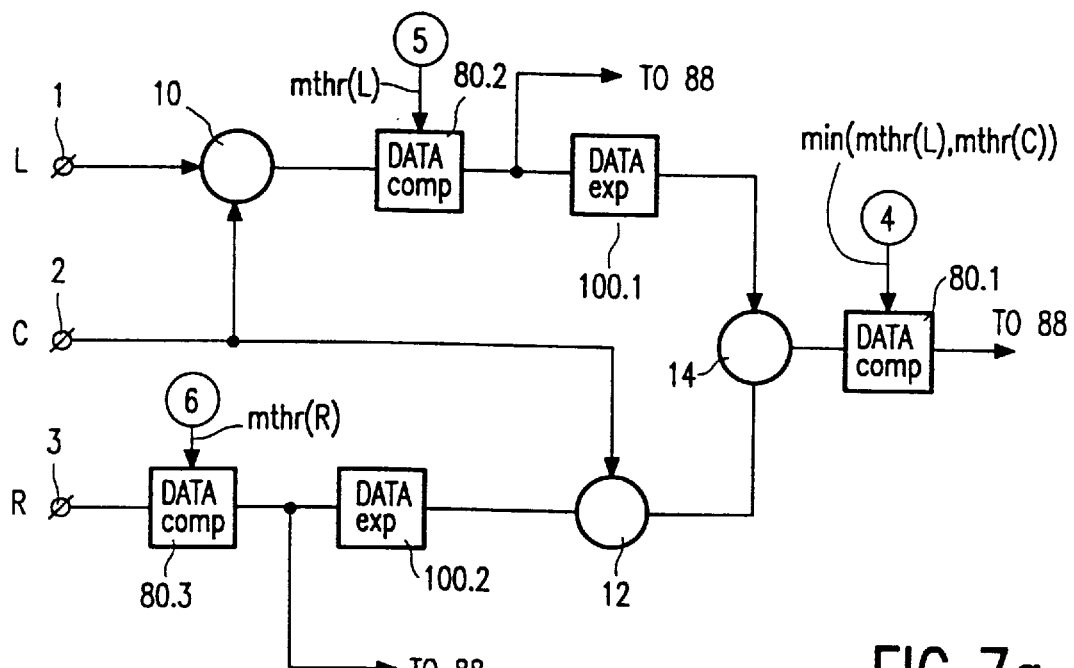
FIGS. 7a, 7b and 7c show the additional feature of data expansion of the data compressed signals, prior to matrixing them in the matrixing unit, for three different selections of the first and second auxiliary signals.

A additional measure, that can be applied to the encoder apparatus in order to further improve the encoding and subsequent decoding process, among others, because it decreases the data rate of the transmitted signal, is the measure to data compress and subsequently expand the selected auxiliary signals prior to applying them to the matrixing circuit of FIG. 1. This measure is shown in FIG. 7a, going out from the situation given in FIG. 5, where the signals $S_l$ and R had been selected as auxiliary signals. As can be seen, in the FIG. 7a, each data compression unit 80.2 and 80.3 is followed by a data expansion unit 100.1 and 100.2, respectively. At the output of an expansion unit, a replica of the original signal applied to the preceding compression unit is obtained, which is further used in the matrixing circuit for obtaining the composite signal $M_0$. An extensive discussion of this measure of pre-quantization and subsequent expansion is given in the Documents (2) and (8). The outputs of the compression units 80.1 to 80.3 are supplied to the combining unit 88 of FIG. 2, as is indicated in FIG. 7a.

The selection of the masked thresholds required for carrying the data compression in the data compression units 80.1, 80.2 and 80.3 is different from the way described above. In the situation shown in FIG. 7a, different masked thresholds will generally be supplied to the three data compression units 80.1, 80.2 and 80.3. More specifically, the data compressor unit 80.1 requires the minimum of the masked thresholds derived from the signals L and C as the masked threshold for carrying out the data compression on the signal $M_0$, the data compressor 80.2 requires the masked threshold derived from the signal L as the masked threshold for carrying out the data compression on the signal $S_l$ and the data compressor 80.3 requires the masked threshold derived from the signal R as the masked threshold for carrying out the data compression on the signal R.

Figure 7B:
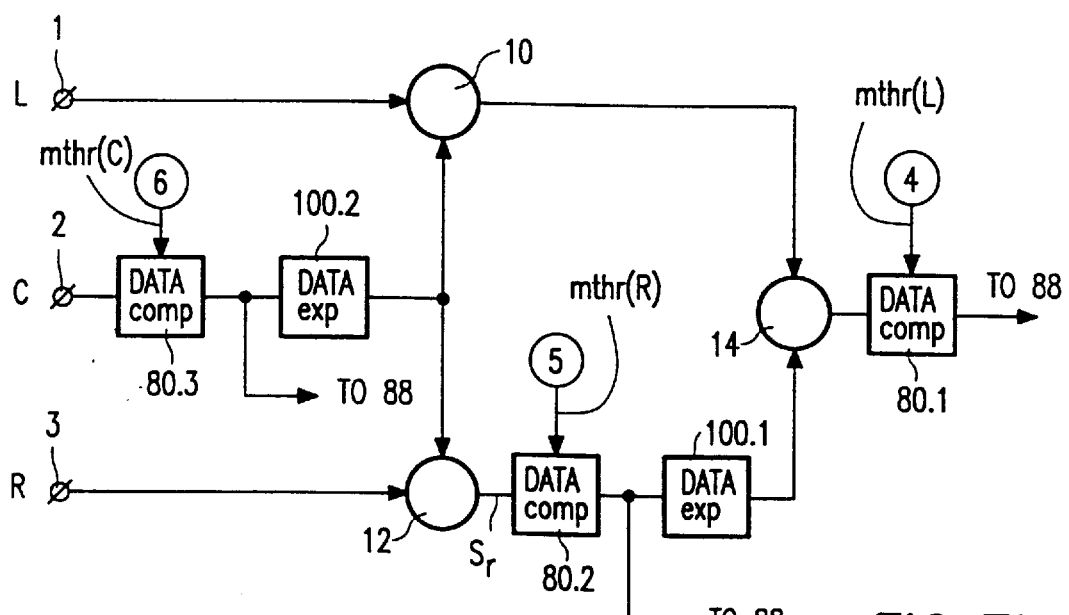

For another selection of the first and second auxiliary signals, which are the signals $S_r$ and C, respectively, and shown in FIG. 7b, the masked thresholds required for the three data compression units 80.1, 80.2 and 80.3 are as explained hereafter.

The data compressor unit 80.1 requires the masked threshold derived from the signal L for carrying out the data compression on the signal $M_0$, the data compressor 80.2 requires the masked threshold derived from the signal R as the masked threshold for carrying out the data compression on the signal S, and the data compressor 80.3 requires the masked threshold derived from the signal C as the masked threshold for carrying out the data compression on the signal C.

Figure 7C:
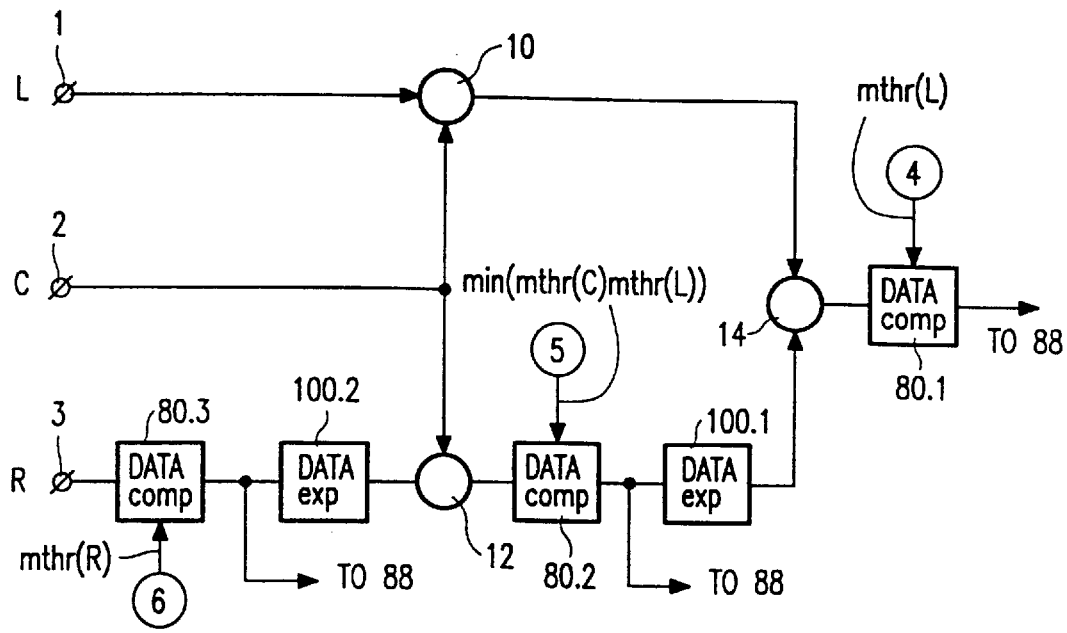

For again another selection of the first and second auxiliary signals, which are the signals $S_r$ and R, respectively, and shown in FIG. 7c, the masked thresholds required for the three data compression units 80.1, 80.2 and 80.3 are as explained hereafter.

The data compressor unit 80.1 requires the masked threshold derived from the signal L as the masked threshold for carrying out the data compression on the signal $M_0$, the data compressor 80.2 requires the minimum of the masked thresholds derived from the signals C and L as the masked threshold for carrying out the data compression on the signal $S_r$, and the data compressor 80.3 requires the masked threshold derived from the signal R as the masked threshold for carrying out the data compression on the signal L.

Knowing the masked thresholds required for the three data compression units 80.1, 80.2 and 80.3 for the selections of the first and second auxiliary signals given in the FIGS. 7a, 7b and 7c, it is now more or less straightforward to derive the required masked thresholds for other selections of the first and second auxiliary signal, namely, by converting the other selection to one of the selections described above. As an example, suppose, the signals, $S_l$ and L have been selected as the first and second auxiliary signal respectively. This situation can be obtained from the selection shown in the FIG. 7c by interchanging R by L and $S_r$ by $S_l$.

Figure 6B:
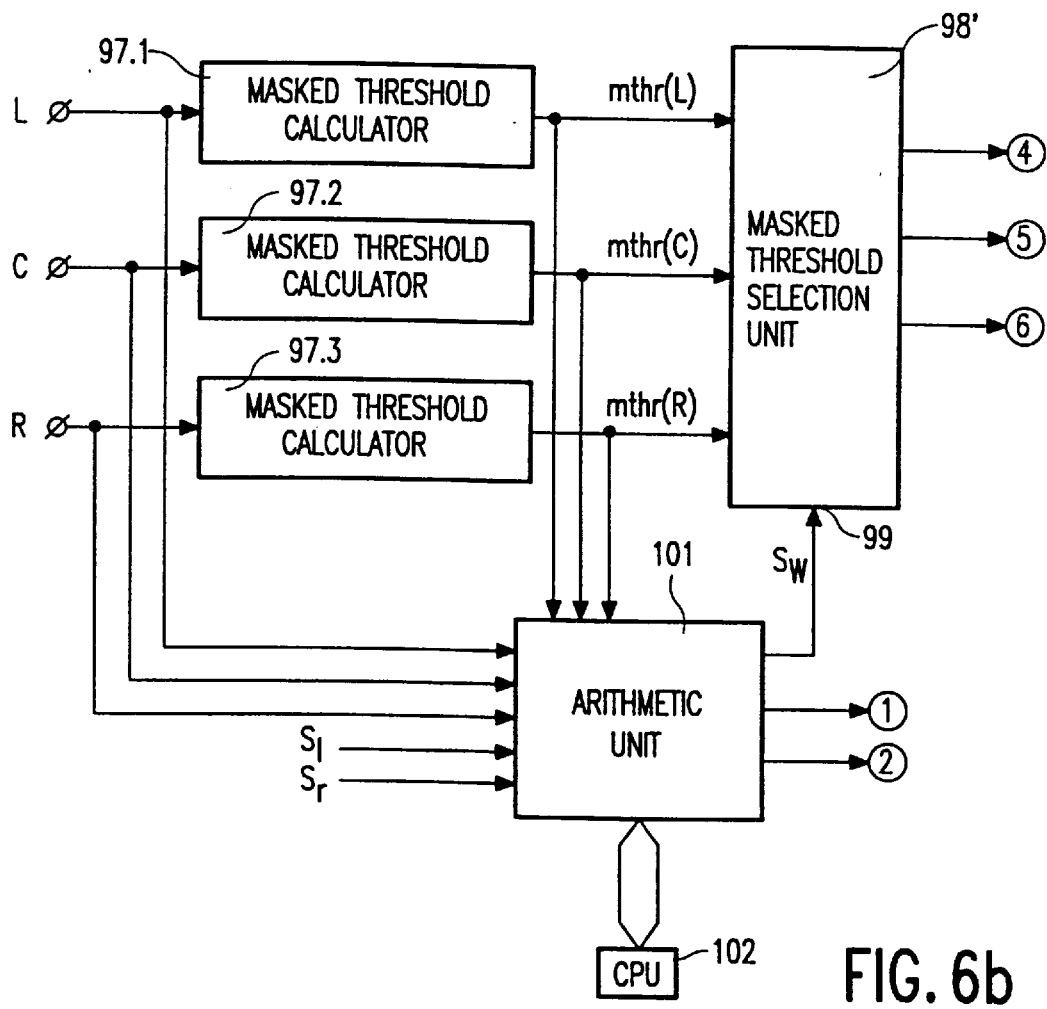
FIG. 6b shows another embodiment of the circuit for selecting the masked thresholds required for carrying out the data compression in the three data compression circuits.

In order to provide the data compression units 80.1, 80.2 and 80.3 with the correct masked threshold in order to carry out a data compression step, the calculation unit shown in FIG. 6b is provided. The circuit of FIG. 6b shows some resemblance with the circuit given in FIG. 6a. Again the masked threshold selection unit 98' and the three masked threshold calculators 97.1, 97.2 and 97.3 are provided which receive the three signals L, C and R, respectively. The masked threshold calculators 97.1 to 97.3 calculate three masked thresholds mthr(L), mthr(C) and mthr(R) from the signals L, C and R supplied to their inputs, respectively. The three masked thresholds thus obtained are supplied to the selection unit 98'.

The masked threshold selection unit 98' selects one masked threshold from the three masked thresholds and supplies the masked threshold selected to one of its three outputs. The selection depends on the selection of the signals that will be selected as the first and second auxiliary signals. The selection of the masked thresholds in the selection unit 98' is in response to a switching signal sw supplied to a control signal input 99. One of the outputs of the selection unit 98', denoted with the encircled number 4, supplies a selected one of the three masked thresholds to the data compression unit 80.1, see also FIG. 2. The second output of the selection unit 98', denoted with the encircled number 5, supplies a selected one of the three masked thresholds to the data compression unit 80.2. The third output of the switching unit 98, denoted with the encircled number 6, supplies a selected one of the three masked thresholds to the data compression unit 80.3.

The switching signal sw is supplied by an arithmetic unit 101. This arithmetic unit 101 further receives the three masked thresholds generated by the masked threshold calculators 97.1 to 97.3, as well as the original three signals L, C and R, the signals $S_l$ and $S_r$, and the signal $M_0$, namely, in the embodiment of the calculation unit 94a, described above with reference to FIG. 3. The arithmetic unit 101 is controlled by means of a central processing unit 102.

Figure 3:
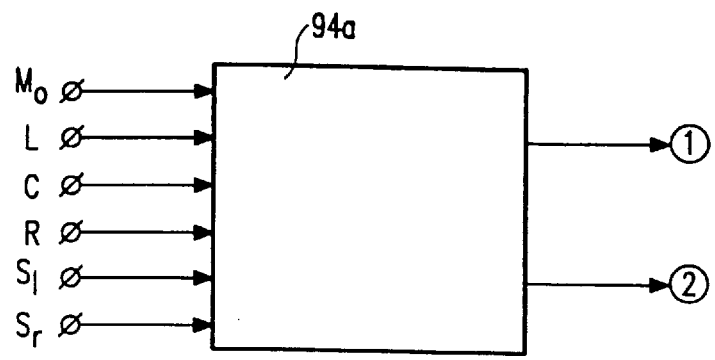
FIGS. 3 and 4 show various embodiments of the calculation unit in the encoder, for deriving the selection signals.

In accordance with the first embodiment of the unit 94a, shown in FIG. 3, the arithmetic unit 101 is adapted to calculate the amount of data reduction to be achieved with the data compressor units 80.1, 80.2 and 80.3 dependent of which signal of the two signals from the first group of signals ($S_l$, $S_r$) has been chosen as the first auxiliary signal and which signal of the three signals from the second group of signals (L, C, R) has been chosen as the second auxiliary signal. The arithmetic unit 101 is further adapted to establish those selections from the first and the second groups of signals that result in the largest amount of data reduction to be achieved, and generates the two selection signals in response thereto. Those selection signals are supplied as the output signals of the calculation unit 94a. Further, a switching signal sw is generated by the arithmetic unit 101 in response to the two selection signals generated, so that the correct masked thresholds are supplied to the three data compression units 80.1, 80.2 and 80.3.

In the (second) embodiment of the calculation unit 94b, shown in FIG. 4, the arithmetic unit 101 is adapted to calculate the amount of data reduction to be achieved with the data compressor units 80.1 and 80.2 of FIG. 2 dependent of the selections for the two auxiliary signals made. The arithmetic unit 101 is further adapted to establish those selections result in the largest amount of data reduction to be achieved, and to generate the two selection signals in response thereto. Those selection signals are supplied as the output signals of the calculation unit 94b. Further, the switching signal sw is generated by the arithmetic unit 101 in response to the two selection signals generated, so that the correct masked thresholds are supplied to the three data compression units 80.1 to 80.3.

The masked thresholds selected and denoted by the encircled numbers 4, 5 and 6, or masked threshold control signals derived therefrom, are supplied to the combining unit 88 as well, see the signal line 72' to the combining unit 88, for transmission to the decoder, as is shown in FIG. 2.

Document (8) of the List of References, given below, more specifically the FIGS. 11 and 12 in that document, discloses a further improvement. The document describes the measure to data expand a data compressed signal directly after compression. The data expanded signal and the original signal ($L_o$), prior to compression, are subtracted from each other and the difference signal thus obtained is supplied to the other signal ($R_o$)

Figure 8A:
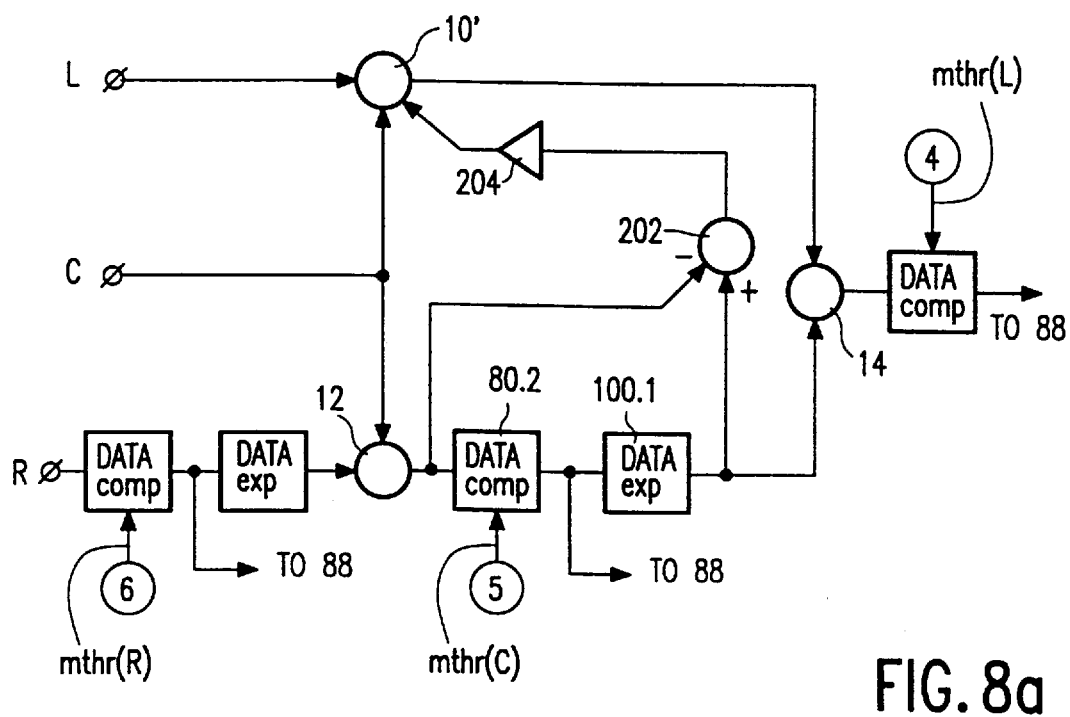
FIGS. 8a and 8b show a further improvement to the encoder apparatus for two different selections of the first and second auxiliary signals.

Applying the teachings of the Document (8) to the present invention, such as the circuit of FIG. 7c results, as an example, in the circuit of FIG. 8a. A subtractor unit 202 is present having one input coupled to the input of the data compression unit 80.2 and a second input coupled to the output of the data expansion unit 100.1. The output of the subtractor unit 202 is coupled to an additional input of the signal combination unit 10', preferably via an amplification unit 204. As a result of this, the data compression unit 80.2 now requires the masked threshold derived from the signal C so as to carry out the data compression on the signal $S_r$.

Figure 8B:
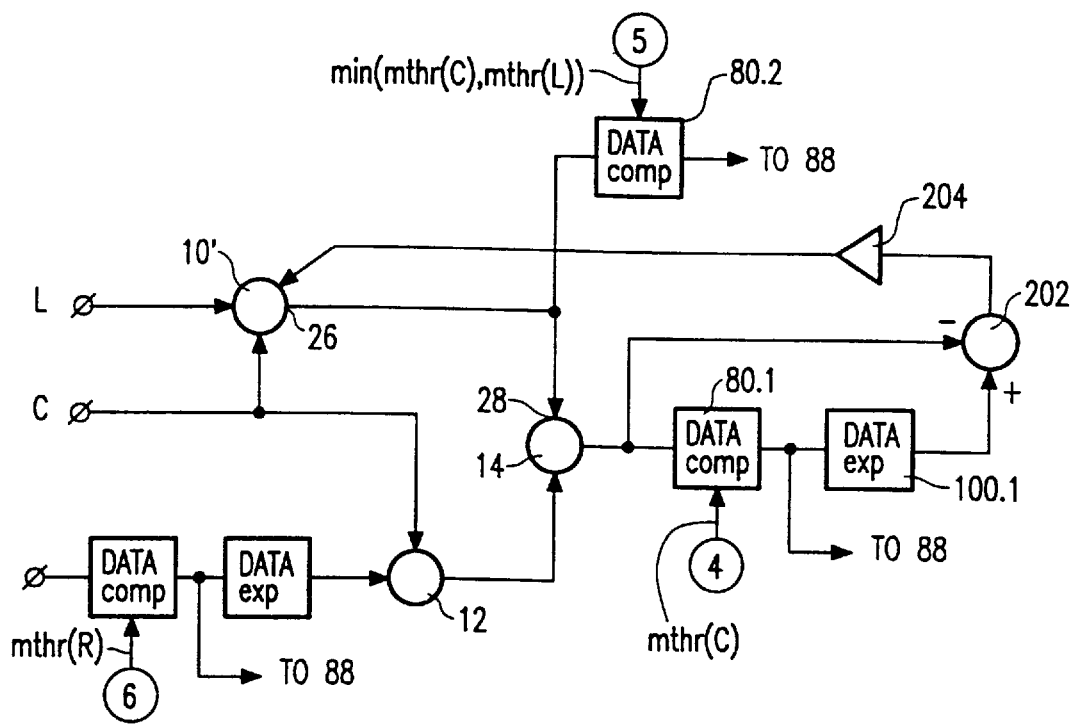
Figure 11:
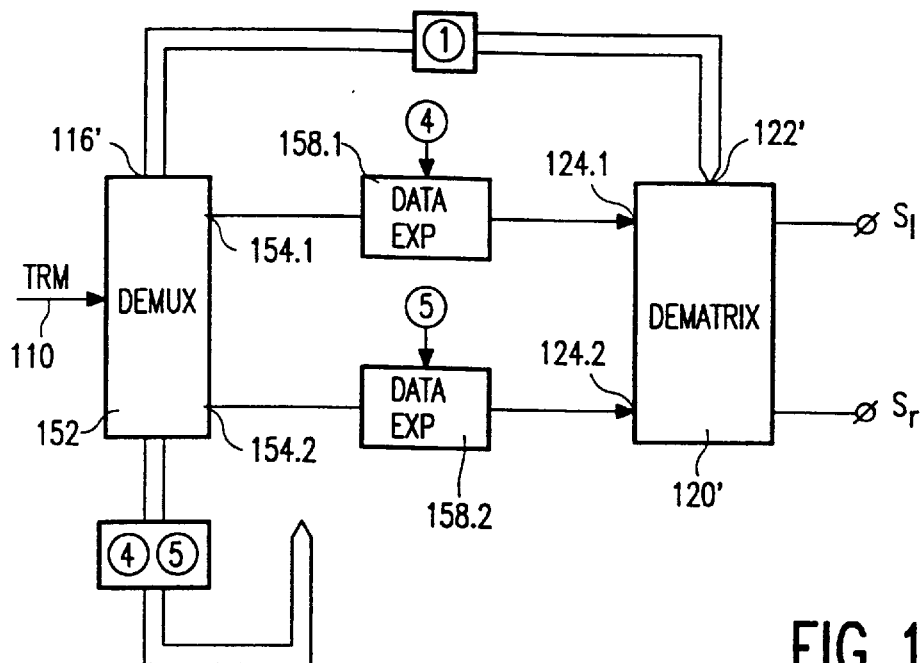
FIG. 11 shows the decoding of the transmission signal by a prior art stereo decoder.
Figure 12:
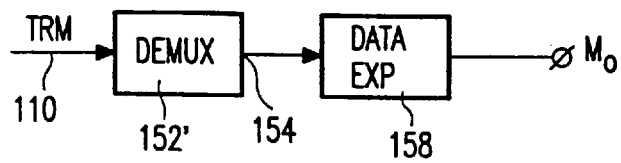
FIG. 12 shows the decoding of the transmission signal by a prior art mono decoder.

The teachings of the FIGS. 11 and 12 of Document (8) can also be applied to the situation shown in FIG. 7a. This is shown in FIG. 8b. The circuit diagram shown in FIG. 8b differs from the circuit diagram shown in FIG. 7a, in that an additional data expansion unit 100.1 is provided for data expanding the data compressed signal supplied by the data compression unit 80.1. A subtractor circuit 202 is present having one input coupled to the input of the data compression unit 80.1 and a second input coupled to the output of the data expansion unit 100.1. The output of the subtractor circuit 202 is coupled to an additional input of the signal combination unit 10', preferably via an amplification unit 204. As a result of this, the data compression unit 80.1 now requires the masked threshold derived from the signal C so as to carry out the data compression on the signal $M_0$. Further, in the circuit diagram of FIG. 8b, the output 26 of the signal combination unit 10' is directly coupled to the input 28 of the signal combination unit 14. Therefore, the minimum of mthr (C) and mthr (L) must be applied as the masked threshold to data compression unit 80.2.

Figure 9A:
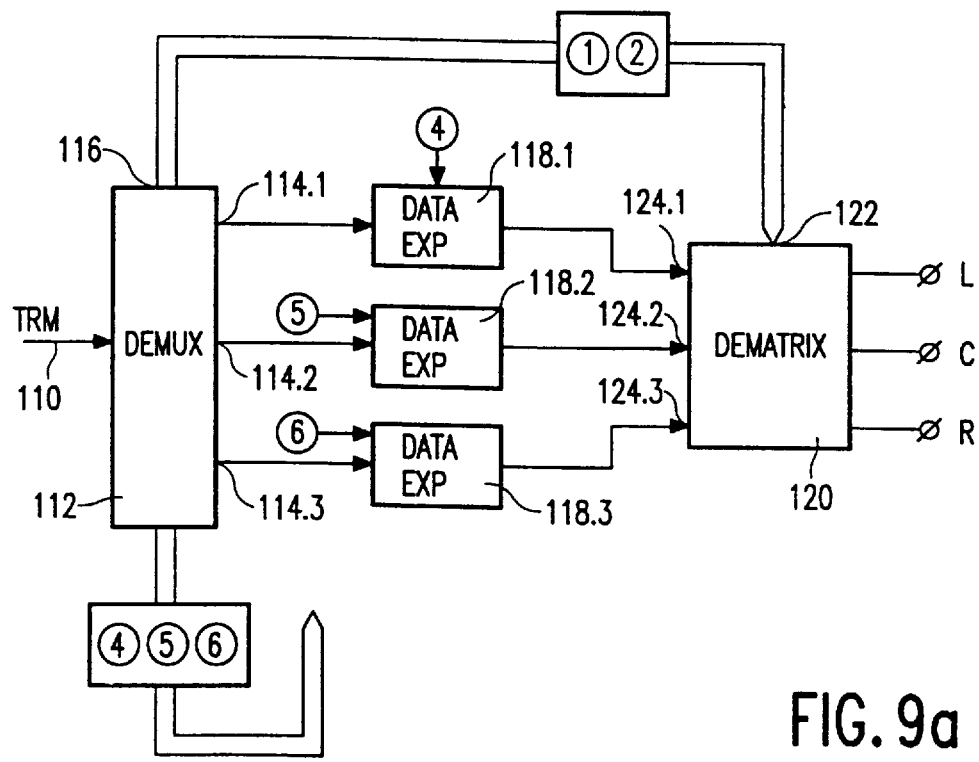
FIG. 9a shows the decoder apparatus in accordance with the invention.

FIG. 9a shows an embodiment of a 3-channel decoder apparatus for decoding the transmission signal into replicas of the original signals. The decoder apparatus has an input for receiving the transmission signal. The transmission signal is supplied to a demultiplexer unit 112, after having carried out a channel decoding step, which is the inverse of the channel encoding step carried out in the encoder. The demultiplexer unit 112 is capable of retrieving the three signal components, that is: the data compressed composite signal $M_0$ and the data compressed first and second auxiliary signals from the serial datastream and supplies the data reduced composite signal $M_0$ to an output 114.1, the datareduced first auxiliary signal to an output 114.2 and the second data reduced auxiliary signal to the output 114.3. Further, the demultiplexer unit 112 retrieves the selection signals from the serial datastream and supplies the selection signals to an output 116. The outputs 114.1 to 114.3 are coupled to inputs of respective data expansion units 118.1 to 118.3. At the outputs of the expansion units 118.1 to 118.3, replicas of the original signals applied to the data compression units 80.1, 80.2 and 80.3 become available, in response to the masking control signals, denoted encircled numbers 4 to 6, also retrieved by the demultiplexer unit 112 from the transmission signal. The replicas are supplied to respective inputs of a dematrixing unit 120. The selection signals retrieved by the demultiplexer 112 are supplied to a control input 122 of the dematrixing unit 120, so as to dematrix the signals applied to its inputs 124.1 to 124.3 into the replicas of the original signals L, C and R.

The 3-channel decoder apparatus may be capable of carrying out different decoding steps in response to a transmission signal that comprises portions of different signal content. The transmission signal may include a signal portion that comprise each time a signal block of the data compressed signal $M_0$, a signal block of the data compressed signal $AUX_1$ and a signal block of the data compressed signal $AUX_2$, that have been obtained from one and the same encoding step in the encoder apparatus and thus belong together. This is indicated in FIG. 9a by the three signal blocks denoted $M_0$, $AUX_1$ an $AUX_2$ in the block 170. The fact that the three signal blocks belong together can be identified by including an identification in each of the three blocks.

Figure 9B:
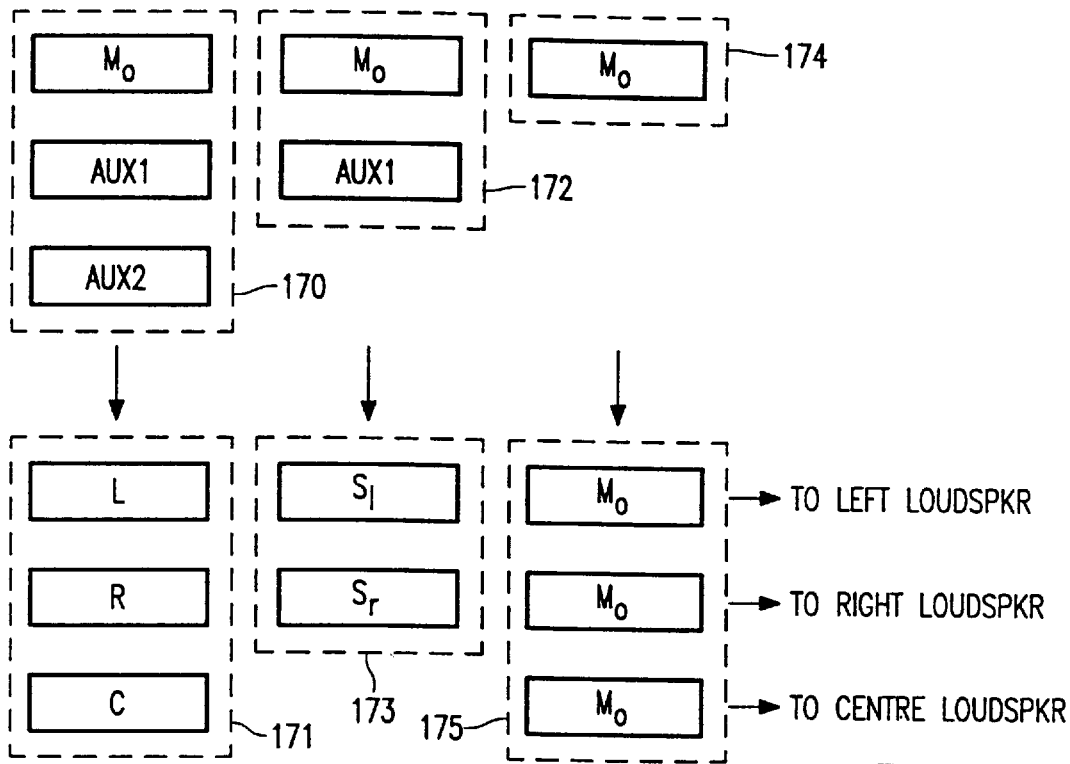
FIG. 9b shows different decoding steps, dependent of transmission signals having a different data content.

As explained above, the decoder apparatus is capable of decoding the three signal blocks into signal blocks of replicas of the signals L, R and C, as given by the block 171 in FIG. 9b, and supply the three signals to the front left, the front right and the center loudspeaker respectively.

For any given reason, such as that the bandwidth of the transmission medium TRM is smaller during a certain time interval (a situation that indeed may occur in internet applications), the transmission signal may include signal portions comprising signal blocks of the data compressed signals $M_0$ and $AUX_1$ only. This is indicated in FIG. 9b by the signal blocks denoted $M_0$ and $AUX_1$ in the block 172. The decoder apparatus may now also be capable of decoding the two signal blocks into signal blocks of replicas of the signals $S_l$ and $S_r$, as given by the block 173 and supply those signals to the front left and front right loudspeakers.

For an even smaller bandwidth of the transmission medium, the transmission signal may include signal portions comprising signal blocks of the data compressed signal $M_0$ only. This is indicated in FIG. 9b by the signal block denoted $M_0$ in the block 174. The decoder apparatus may now also be capable of decoding the signal block into a signal block of a replica of the signal $M_0$, and supply this signal block to the front left, the front right and the center loudspeaker, as shown in the block 175 in FIG. 9a.

Figure 10:
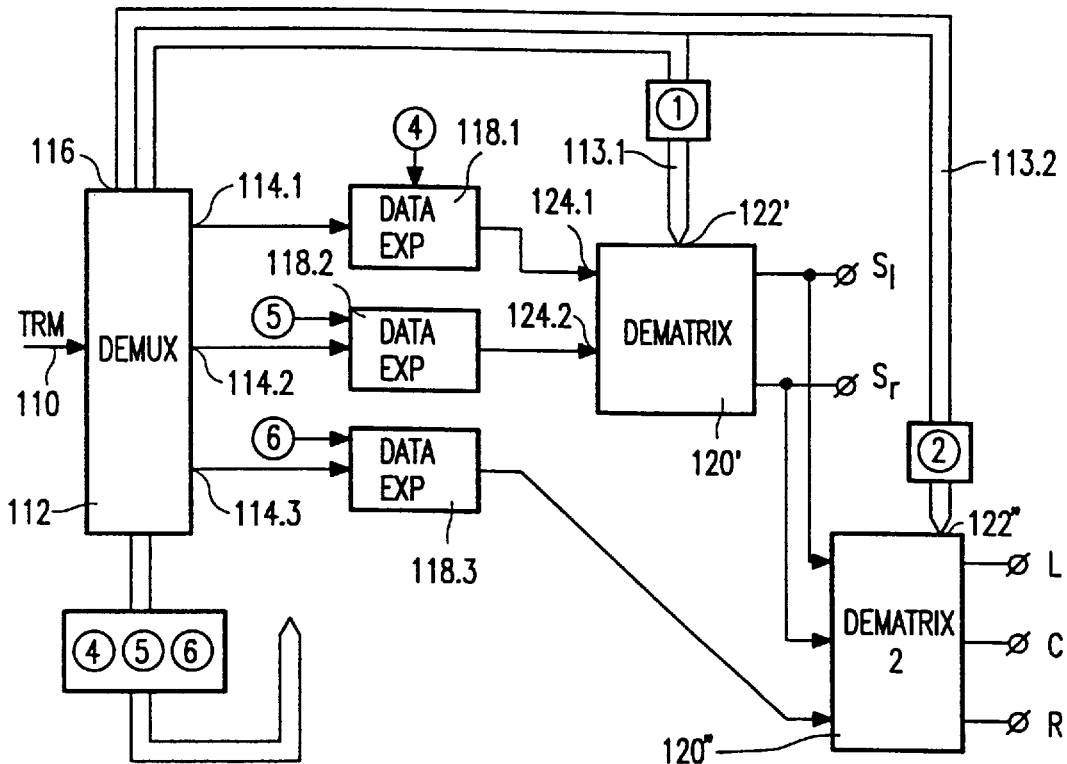
FIG. 10 shows another embodiment of the decoder apparatus in accordance with the invention.

FIG. 10 shows another embodiment of the decoder apparatus in accordance with the invention. The decoder apparatus shows large resemblance with the decoder apparatus of FIG. 9a. Instead of having one dematrixing unit 120, as in FIG. 9a, the apparatus of FIG. 10 has two dematrixing units 120' and 120". The demultiplexer unit 112 retrieves the selection signals from the serial datastream and supplies part of the selection signals, namely, the selection signal denoted by encircled number 1 to the control input 122' of the dematrixing unit 120' and supplies the selection signal, denoted by encircled numbers 2, to the control input 122" of the dematrixing unit 120". The dematrixing unit 120' receives the composite signal $M_0$ and the first auxiliary signal and generates the signals $S_l$ and $S_r$ in response to the selection control signal supplied to the control signal input 122'. The dematrixing unit 120" receives the signals $S_l$ and $S_r$ as supplied by the dematrixing unit 120', as well as the second auxiliary signal and generates the signals L, C and R in response to the selection control signal supplied to the control signal input 122".

FIG. 11 shows a prior art 2-channel decoder apparatus for decoding the transmission signal. The decoder apparatus has an input for receiving the transmission signal generated by the encoder described above, thus including signal portions of three signals. The transmission signal is supplied to a demultiplexer unit 152, after having carried out a channel decoding step, which is the inverse of the channel encoding step carried out in the encoder. As the transmission signal is backwards compatible, as will be explained later, the demultiplexer unit 152 is capable of retrieving the data compressed composite signal $M_0$ and the data compressed first auxiliary signal from the serial datastream and supplies the data reduced composite signal to an output 154.1 and the datareduced first auxiliary signal to an output 154.2. The demultiplexer thus ignores the data reduced second auxiliary signal included in the serial datastream. Further, the demultiplexer unit 152 ignores the selection signal denoted encircled number 2, solely derives the selection signal denoted encircled number 1 from the serial data stream and supplies the selection signal to the dematrixing unit 120'. The outputs 154.1 and 154.2 are coupled to inputs of respective data expansion units 158.1 and 158.2. At the outputs of the expansion units 158.1 and 158.2, replicas of the original signals $M_0$ and $S_l$ (or $S_r$) become available. Those signals are applied to the dematrixing unit 120' in which the other one of the combination signals $S_r$ (or $S_l$) will be derived.

FIG. 12 shows a prior art mono decoder apparatus for decoding the transmission signal. The decoder apparatus has an input for receiving the transmission signal generated by the encoder described above, thus including signal portions of three signals. The transmission signal is supplied to a demultiplexer unit 152', after having carried out a channel decoding step, which is the inverse of the channel encoding step carried out in the encoder. As the transmission signal is backwards compatible, the demultiplexer unit 152' is capable of retrieving the data compressed composite signal $M_0$ only from the serial datastream and supplies the data reduced composite signal to an output 154.1 and the datareduced first auxiliary signal to an output 154. The demultiplexer thus ignores the data reduced first and second auxiliary signals included in the serial datastream. Further, the demultiplexer unit 152 ignores the selection signals, denoted encircled numbers 1 and 2. The output 154 is coupled to an input of data expansion unit 158. At the output of the expansion unit 158 a replica of the original signal $M_0$ become available.

Figure 13:
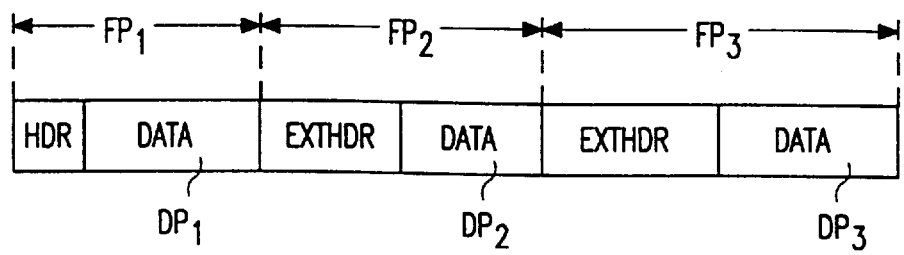
FIG. 13 shows a frame included in the transmission signal.

FIG. 13 shows an example of the sequence in which the three signal components are included in the transmission signal. FIG. 13 shows schematically, a frame F of information. The frame F comprises first, second and third frame portions FP1, FP2 and FP3, respectively. The first frame portion FP1 comprises a header portion, denoted HDR, and a data portion, denoted DP1. The data portion DP1 comprises so-called MPEG-1 information. This is the sub-band information discussed in Document (3), such as allocation information, scale factors and quantized samples of the mono signal component $M_0$. In terms of the signals described above, the composite signal $M_0$ is stored after data compression by the above described encoder in this dataportion DP1. The second frame portion FP2 comprises a header portion, denoted EXTHDR, and a data portion DP2. The data portion DP2 is meant for storing additional data. In terms of the signals described above, a block of information, comprising data of the first data reduced auxiliary signal, is stored in this data portion DP2. The third frame portion FP3 comprises a header portion, also denoted EXTHDR, and a data portion DP3. The data portion DP3 is meant for storing additional data. In terms of the signals described above, a block of information, comprising data of the data reduced second auxiliary signals, is included in said data portion DP3, see FIG. 13. The header portion EXTHDR of the second frame portion FP2 comprises a first identifier, identifying the data in the data portion DP2 as information relating to the first auxiliary signal. Said in a different way: the first identifier identifies the information comprised in the data portion DP2 as information corresponding to the data compressed first auxiliary signal. The header portion of the second frame portion FP2 further comprises the selection signal denoted earlier by the encircled number 1. The header portion EXTHDR of the third frame portion FP3 comprises a second identifier, identifying the data in the data portion DP3 as the second auxiliary signal. Said in a different way: the second identifier identifies the information comprised in the data portion DP3 as information corresponding to the data compressed second auxiliary signal. The header portion of the third frame portion FP3 further comprises the selection signal denoted earlier by the encircled number 2.

A prior art mono decoder will recognize the information stored in the first frame portion FP1 as being mono information and supply the replica of the composite signal $M_0$ at its output. The decoder will ignore the data contained in the frame portions FP2 and FP3 as, if it tries to decode this information, it will not recognize the information contained in those portions. A prior art stereo decoder, such as described in the Documents (2) and (8), will recognize the information stored in the frame portion FP1 and the information stored in the frame portion FP2 as being a 2-channel information stream and supply the replicas of the signals $S_l$ and $S_r$ to its outputs. The decoder will ignore the data contained in the frame portion FP3 as, if it tries to decode this information, it will not recognize the information in this portion. The above described 3-channel decoder is capable of recognizing the complete datastream and recover the replicas of the three original signals L, C and R.

In another embodiment, the frame portions FP1, FP2 and FP3 need not necessarily be included together in one frame, but could be included not directly the one after the other in the serial datastream of the transmission signal. In such a situation, the portions should include an indication identifying the portions FP1, FP2 and FP3 comprising information that belong together and should be decoded together.

Figure 14:
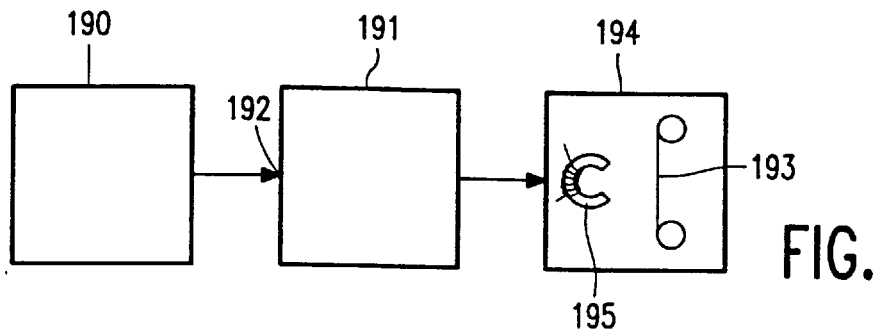
FIG. 14 shows the encoder apparatus included in a recording arrangement.

The encoder apparatus can be used in an arrangement for storing the signal supplied by the encoder apparatus on a storage medium, such as a record carrier. FIG. 14 schematically shows such a storage arrangement in the form of a recording arrangement. The block denoted by 190 is the encoder apparatus described above. The block denoted by 191 can be a channel encoder, if the channel encoder is not incorporated in the combining unit 88. In the channel encoder, the signal applied to its input 192 is encoded in, as an example, a Reed-Solomon encoder, and an interleaver, so as to enable an error correction to be carried out in the receiver. Further, again as an example, an 8-to-10 modulation well known in the art, see Document (5) in the List of References, is carried out. The signal thus obtained is recorded in one track or a multiplicity of tracks on a record carrier 193, such as a magnetic or optical record carrier, by means of writing means 194, such as a magnetic or optical head 195. The storage medium may alternatively be a solid state memory.

Figure 15:
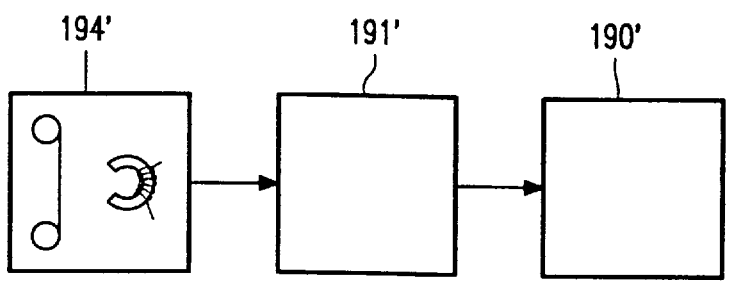
FIG. 15 shows the decoder apparatus included in a reproducing arrangement.

An arrangement for retrieving the information from the storage medium is shown in FIG. 15. FIG. 15 shows an arrangement for reproducing the transmission signal from the above record carrier. A channel decoding must be carried out on the reproduced information which is inverse to the channel encoding during recording. That is: a 10-to-8 reconversion must be carried out, followed by an error correction and a de-interleaving. This is followed by the decoder apparatus shown in FIG. 9 or 10. FIG. 15 show blocks 194', 191' and 190' that realize signal processing activities which are the inverse of the signal processing activities in the blocks 194, 191 and 190 respectively, of the arrangement of FIG. 14.

While the present invention has been described with respect to preferred embodiments thereof, it is to be understood that these are not limitative examples. Thus, various modifications may become apparent to those skilled in the art, without departing from the scope of the invention, as defined by the claims. As an example, the invention has been described using wideband digital information signals L, C and R. It should however be noted that the signals L, C and R described and discussed above, are each only one and the same sub-band signal derived from three wideband signals, where the measures in accordance with the invention, as described above, is applied to the signals in each sub-band separately. Reference is made in this respect to Document (8). The invention thus lies in a specific encoding of a 3-channel signal into a data reduced transmission signal, such that a corresponding 3-channel decoder is capable of decoding the transmission signal into the original 3-channel signal, that a prior art 2-channel decoder is capable of decoding the transmission signal into a compatible 2-channel signal and a prior art mono decoder is capable of decoding the transmission signal into a composite mono signal.

Figure 16:
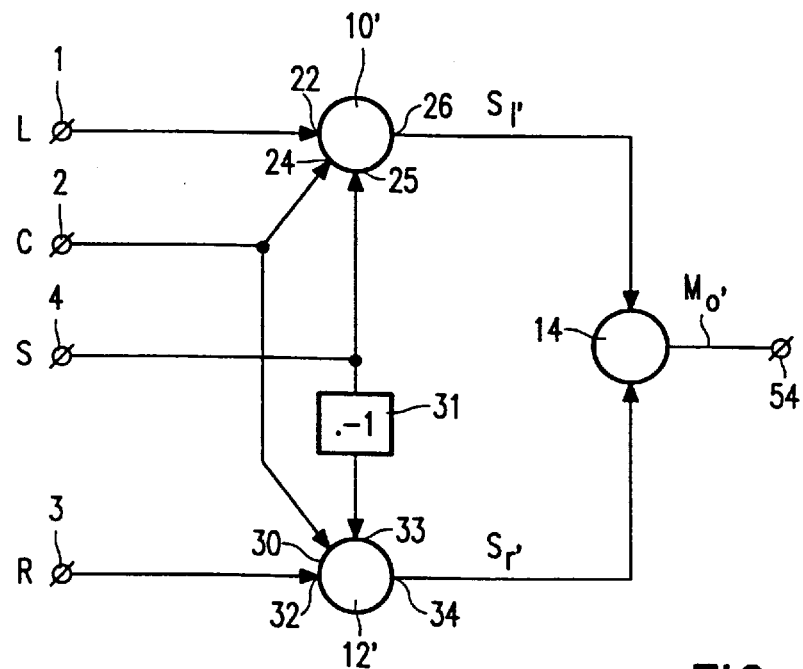
FIG. 16 shows the matrixing circuit of a 4-channel version of the encoder apparatus.

Further, the invention is not restricted to the transmission of a 3-channel signal. As an example, the invention also applies to a 4-channel transmission system. FIG. 16 shows an embodiment of the matrixing unit for this embodiment. The matrixing unit of FIG. 16 shows a large resemblance with the matrixing unit shown in FIG. 1. An additional input terminal is present for receiving a fourth input signal, which is a surround signal S. The input terminal 4 is coupled to a further input 25 of the signal combination unit 10' and via a signal inverter 31 to a further input 33 of the signal combination unit 12'.

At the outputs 26 and 34 of the signal combination units 10' and 12' respectively, signals $S_l$ and $S_r$ respectively, are available that satisfy the following equations:

$$S_l'=L+C+S \tag{Eq.7a}$$

$$S_r'R+C-S \tag{Eq.7b}$$

and $M_0'$ equals $S_l' + S_r'$.

Figure 17:
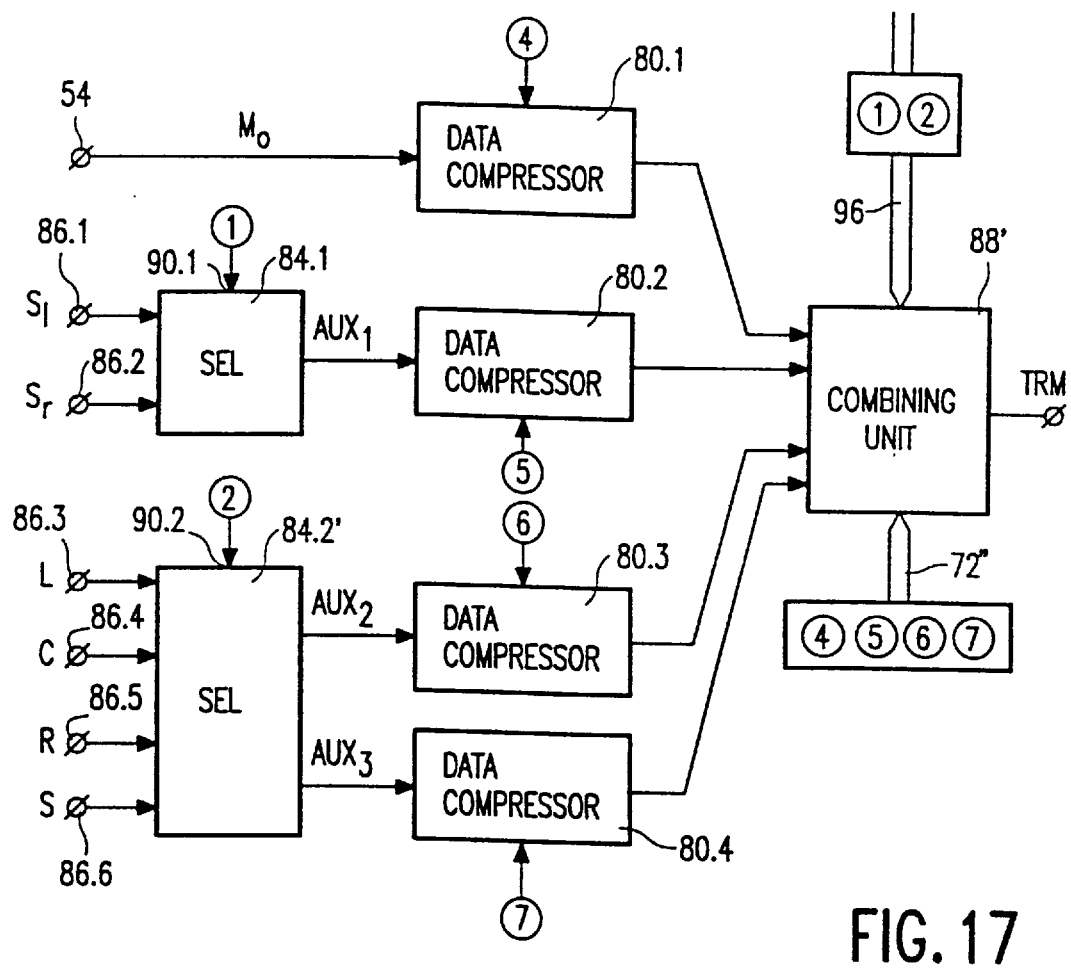
FIG. 17 shows a further portion of the 4-channel encoder apparatus.

FIG. 17 shows a further portion of the 4-channel encoder apparatus. The circuit shown in FIG. 17 shows a large resemblance with the circuit shown in FIG. 2. In addition to the circuit of FIG. 2, the selection unit 84.2' now selectes two signals from the signals L, C, S and R, supplied to the terminals 86.3 to 86.6 and supplied the two selected signals as the second and a third auxiliary signal to data compression units 80.3 and 80.4, respectively. The data compressed third auxiliary signal is also supplied to the combination unit 88' for transmission via the transmission medium TRM. An additional masked threshold, or a masked threshold control signal derived therefrom, is required for carrying out the data compression in the data compressor 80.4. This masked threshold (control signal) is denoted by encircled number 7. The masked thresholds numbered encircled numbers 4, 5, 6 and 7, or masked threshold control signal derived therefrom, are supplied to the combination unit 88' for transmission to the decoder, so as to enable a corresponding expansion of the data compressed signals in the decoder.

A corresponding 4-channel decoder will be capable of retrieving the four data compressed signals from the transmitted datastream and carry out a corresponding expansion on those data compressed signals so as to obtain replicas of the composite signal $M_0'$ and the auxiliary signals $AUX_1$, $AUX_2$ and $AUX_3$. Upon dematrixing, replicas of the original signals L, C, S and R can be obtained.

A standard 2-channel stereo decoder will be capable of retrieving the data compressed signals $M_0'$ and $AUX_l$ and is capable of data expanding those signals so as to obtain replicas of the signals $M_0'$ and $AUX_l$. The decoder is further capable of retrieving replicas of the signals $S_l'$ and $S_r'$ that can be used for stereo reproduction.

The mono decoder is capable of retrieving the data compressed signal $M_0'$ from the received transmission signal and is capable of data expanding those signal so as to obtain a replica of the signal $M_0'$ for mono reproduction.

Further, the invention lies in each and every novel feature or combination of features as herein disclosed.

LIST OF REFERENCES (1a) J.A.E.S., Vol. 40, No. 5, May 1992, pp. 376–382, (1b) 'Matrixing of bitrate reduced audio signals' by W.R.Th. ten Kate et al, in Proc. of the ICASSP, 1992, March 23–26, San Francisco, Vol.2, pp. II-205 to II-208.

(2) U.S. Pat. No. 4,481,643 (PHQ 93-002)

(3) European Patent Application no. EP 402,973, corresponding to U.S. Pat. No. 5,323,396 (PHN 13.241).

(4) European Patent Application No. EP 497,413A1, corresponding to U.S. patent application Ser. No. 08/326,146, filed Oct. 19, 1994, now U.S. Pat. No. 5,621,855 (PHN 13.581)

(5) U.S. Pat. No. 4,620,311 (PHN 11.117).

(6) European Patent Application no. EP 400,755, corresponding to U.S. Pat. No. 5,214,678 (PHQ 89.018A).

(7a) European Patent Application no. EP 457,390, corresponding to U.S. Pat. No. 5,365,553 (PHN 13.328).

(7b) European Patent Application no. EP 457,390 corresponding to U.S. Pat. No. 5,367,608 (PHN 13.329).

(8) European Patent Application No. EP 678,226-A1 corresponding to U.S. Pat. No. 5,544,247 and U.S. patent application Ser. No. 08/651,016, filed May 21, 1996 (PHN 14.615)

(9) ISO/IEC international standard IS 11172-3, Information technology—coding of moving pictures and associated audio for digital storage media up to about 1.5 Mbit/s, Part 3: audio.

(10) ISO/IEC international standard IS 13818-3, Information technology—coding of moving pictures and associated audio, Part 3: audio.

I claim:

1. An apparatus for encoding a plurality of digital information signals, said apparatus comprising:

first input means for receiving a first digital information signal;

second input means for receiving a second digital information signal;

third input means for receiving a third digital information signal; and matrixing means for generating a digital composite signal from the first, second and third digital information signals, the matrixing means comprising:

first signal combination means for combining at least the first and second digital information signals and for generating a first combination signal;

second signal combination means for combining at least the second and third digital information signals and for generating a second combination signal; and third signal combination means for combining at least the first and second combination signals and for generating the digital composite signal, wherein the apparatus further comprises:

first data compression means for data compressing the digital composite signal to form a data reduced digital composite signal;

selection means for selecting one signal from the first combination signal and the second combination signal to form a first auxiliary signal, and for selecting at least one signal from the at least first, second and third digital information signals to form at least a second auxiliary signal;

at least second and third data compression means for data compressing the first auxiliary signal and at least the second auxiliary signal, respectively, to form at least a first data reduced auxiliary signal and a second data reduced auxiliary signal, respectively; and formatting means for combining the data reduced digital composite signal and the at least first and second data reduced auxiliary signals into a transmission signal for transmission via a transmission medium.

2. The apparatus as claimed in claim 1, wherein the selection means selects one signal from the first, second and third digital information signals to form said second auxiliary signal.

3. The apparatus as claimed in claim 2, wherein said apparatus further comprises calculation means for calculating a data reduction value representative of the amount of data reduction to be achieved with at least the first data compression means depending on which signal of the first and second combination signals, and which signal of the first, second and third digital information signals have been selected as the first and second auxiliary signals, respectively, the calculation means further establishing those selections of the one signal from the first and second combination signals, and the one signal from the first, second and third digital information signals that results in a data reduction value which is representative of the largest amount of data reduction to be achieved, and generating a selection control signal in response thereto, the selection means receiving the selection control signal and selecting the auxiliary signals in response to said selection control signal.

4. The apparatus as claimed in claim 3, wherein the formatting means further combines the selection control signal into the transmission signal.

5. The apparatus as claimed in claim 1, wherein each of said first, second and third signal combination means multiplies a first input signal received via a first input with a first multiplication value, multiplies a second input signal received via a second input with a second multiplication value, and adds together the multiplied values of the first and second input signals.

6. The apparatus as claimed in claim 1, wherein the apparatus further comprises first and second data expansion means coupled to the second and third data compression means, respectively, for carrying out an expansion step to form replicas of the first and second auxiliary signals, respectively, the replica of the first auxiliary signal being supplied to the third signal combination means instead of the first combination signal, if said first auxiliary signal is the first combination signal, or instead of the second combination signal, if said first auxiliary signal is the second combination signal, the replica of the second auxiliary signal being supplied to the first signal combination means instead of the first digital information signal, if said second auxiliary signal is the first digital information signal, the replica of the second auxiliary signal being supplied to the first signal combination means and the second signal combination means instead of the second digital information signal, if said second auxiliary signal is the second digital information signal, the replica of the second auxiliary signal being supplied to the second signal combination means instead of the third digital information signal, if said second auxiliary signal is the third digital information signal.

7. The apparatus as claimed in claim 1, wherein the transmission signal includes first blocks of information comprising data corresponding to the data reduced digital composite signal, second blocks of information comprising data corresponding to the data reduced first auxiliary signal, and third blocks of information comprising data corresponding to the data reduced second auxiliary signal.

8. The apparatus as claimed in claim 7, wherein the transmission signal includes a first selection control signal and a second selection control signal, the first selection control signal indicating the selection of the first auxiliary signal from the first and second combination signals from which the first auxiliary signal has been selected, and the second selection control signal indicating the selection of the second auxiliary signal from the first, second and third digital information signals from which the second auxiliary signal has been selected, the formatting means further storing the first selection control signal in the second blocks of information, and the second selection control signal in the third blocks of information.

9. The apparatus as claimed in claim 7, wherein the formatting means further generates an identifier for identifying the information comprised in the third blocks of information, said formatting means storing the identifier in said third blocks.

10. The apparatus as claimed in claim 1, wherein said apparatus further comprises writing means for writing the transmission signal into a storage medium.

11. A storage medium in which the transmission signal has been written by the apparatus as claimed in claim 10, wherein the transmission signal includes first blocks of information comprising data corresponding to the data reduced first digital composite signal, second blocks of information comprising data corresponding to the data reduced first auxiliary signal and third blocks of information comprising data corresponding to the data reduced second auxiliary signal.

12. A method of encoding a plurality of digital information signals, the method comprising the steps:

receiving a first digital information signal;

receiving a second digital information signal;

receiving a third digital information signal; and generating a digital composite signal from at least the first, second and third digital information signals, the generating step comprising the substeps:

combining at least the first and second digital information signals and thereby generating a first combination signal;

combining at least the third and second digital information signals and thereby generating a second combination signal; and combining at least the first and second combination signals and thereby generating the digital composite signal, wherein the method further comprising the steps:

data compressing the digital composite signal to form a data reduced digital composite signal;

selecting one signal from the first and second combination signals to form a first auxiliary signal, and selecting at least one signal from the at least first, second and third digital information signals to form at least a second auxiliary signal;

data compressing the first auxiliary signal and at least the second auxiliary signal to form at least first and second data reduced auxiliary signals, respectively; and combining the data reduced digital composite signal and the at least first and second data reduced auxiliary signals into a transmission signal for transmission via a transmission medium.

13. The method as claimed in claim 12, wherein said method further comprises the step of writing the transmission signal into a storage medium.

14. An apparatus for decoding a transmission signal received to form a plurality of digital information signals, said apparatus comprising:

input means for receiving the transmission signal;

deformatting means for retrieving a data reduced composite signal and at least first and second data reduced auxiliary signals from the transmission signal;

at least first, second and third data expansion means for data expanding the data reduced composite signal and the at least first and second data reduced auxiliary signals, respectively, to form a composite signal and at least first and second auxiliary signals, respectively;

dematrixing means for generating at least first, second and third digital information signals from the composite signal and the at least first and second auxiliary signals, wherein the dematrixing means comprises first and second dematrixing units, the first dematrixing unit receiving the composite signal and the first auxiliary signal and converting those signals into first and second combination signals, and the second dematrixing unit receiving the second auxiliary signal and the first and second combination signals and converting those signals into the first, second and third information signals;

first output means for supplying the first digital information signal;

second output means for supplying the second digital information signal; and third output means for supplying the third digital information signal.

15. The apparatus as claimed in claim 14, wherein the deformatting means further retrieves a selection control signal from the transmission signal, the dematrixing means further generating the first, second and third digital information signals from the composite signal and the first and second auxiliary signals, in response to the selection control signal.

16. The apparatus as claimed in claim 14, wherein the deformatting means further retrieves first and second selection control signals from the transmission signal, the first dematrixing unit converting the composite signal and the first auxiliary signal into the first and second combination signals, in response to the first selection control signal, and the second dematrixing unit converting the second auxiliary signal and the first and second combination signals into the first, second and third information signals, in response to the second selection control signal.

17. The apparatus as claimed in claim 16, wherein the transmission signal includes first blocks of information comprising data corresponding to the data reduced digital composite signal, second blocks of information comprising data corresponding to the data reduced first auxiliary signal and third blocks of information comprising data corresponding to the data reduced second auxiliary signal, said second blocks further comprising the first selection control signal, and said third blocks further comprising the second selection control signal, the deformatting means further retrieving the first selection control signal from said second blocks and the second selection control signal from said third blocks.

18. The apparatus as claimed in claim 14, wherein the transmission signal includes first blocks of information comprising data corresponding to the data reduced composite signal, second blocks of information comprising data corresponding to the data reduced first auxiliary signal and third blocks of information comprising data corresponding to the data reduced second auxiliary signal, the third blocks further comprising an identifier for identifying the information comprised in the third blocks.

19. The apparatus as claimed in claim 14, wherein said apparatus further comprises reading means for reading the transmission signal from a storage medium.

20. An apparatus for encoding a plurality of n digital information signals, said apparatus comprising:

input means for receiving the n digital information signals; and matrixing means for generating a digital composite signal from the n digital information signals, the matrixing means comprising:

first signal combination means for combining at least a first and a second digital information signal from the n digital information signals and for generating a first combination signal;

second signal combination means for combining at least the (n−1)-th and n-th digital information signals from the n digital information signals and for generating a second combination signal; and third signal combination means for combining at least the first and second combination signals for generating the digital composite signal, wherein the apparatus further comprises:

first data compression means for data compressing the digital composite signal for forming a data reduced digital composite signal;

first selection means for selecting one signal from the first and second combination signals and for forming a first auxiliary signal;

second selection means for selecting (n−2) signals from the n digital information signals and for forming (n−2) other auxiliary signals;

second data compression means for data compressing the first auxiliary signal and for forming a first data reduced auxiliary signal;

third data compression means for data compressing the (n−2) other auxiliary signals and for forming (n−2) data reduced other auxiliary signals; and formatting means for combining the data reduced digital composite signal and the (n−2) data reduced other auxiliary signals into a transmission signal suitable for transmission via a transmission medium, where n is an integer greater than 2.

* * * * *